(12) United States Patent
Putha et al.

(10) Patent No.: US 12,361,555 B2
(45) Date of Patent: Jul. 15, 2025

(54) SYSTEM AND METHOD FOR CLASSIFYING TYPE OF A FRACTURE ON MUSCULOSKELETAL X-RAY IMAGE

(71) Applicant: Qure.ai Technologies Private Limited, Maharashtra (IN)

(72) Inventors: Preetham Putha, Maharashtra (IN); Swetha Tanamala, Maharashtra (IN); Sahil Sahil, Maharashtra (IN); Ravi Kumar Kushawaha, Maharashtra (IN)

(73) Assignee: Qure.ai Technologies Private Limited, Mumbai (IN)

( * ) Notice: Subject to any disclaimer, the term of this patent is extended or adjusted under 35 U.S.C. 154(b) by 0 days.

(21) Appl. No.: 18/935,726

(22) Filed: Nov. 4, 2024

(65) Prior Publication Data
US 2025/0148596 A1    May 8, 2025

(30) Foreign Application Priority Data
Nov. 3, 2023    (IN) .............................. 202321075163

(51) Int. Cl.
*G06T 7/00*    (2017.01)
*G06V 10/764*    (2022.01)
*G06V 10/82*    (2022.01)

(52) U.S. Cl.
CPC .......... *G06T 7/0012* (2013.01); *G06V 10/764* (2022.01); *G06V 10/82* (2022.01);
(Continued)

(58) Field of Classification Search
CPC ......... G06T 7/0012; G06T 2207/10116; G06T 2207/20021; G06T 2207/20076;
(Continued)

(56) References Cited

U.S. PATENT DOCUMENTS

| | | |
|---|---|---|
| 8,538,117 B2 | 9/2013 | Najarian et al. |
| 11,164,045 B2 | 11/2021 | Paik et al. |

(Continued)

FOREIGN PATENT DOCUMENTS

| | | |
|---|---|---|
| CN | 108171714 B | 9/2021 |
| CN | 112598661 B | 7/2022 |
| CN | 113610809 B | 4/2024 |

*Primary Examiner* — Van D Huynh

(57) ABSTRACT

The present subject matter relates to a system (100) and a method (300) for classifying a type of fracture on musculoskeletal X-ray image (101). The system (100) employs a data collection module, a fracture-type classification module including a classification model (207) and a segmentation model (208) based on an artificial intelligence. The data collection module (205) may collect data corresponding to input X-ray images (101), which are then analyzed by a fracture-type classification module (206) using the classification model (207) and the segmentation model (208). Further, the classification model (207) may calculate the classification score and the segmentation module (208) may calculate the segmentation score. The fracture-type classification module may generate the fracture-type score based on the classification score and segmentation score. The fracture-type classification module may be configured for comparing the fracture-type score with a threshold value for each fracture part separately to classify the type of fracture.

10 Claims, 5 Drawing Sheets

(52) U.S. Cl.
CPC .............. *G06T 2207/10116* (2013.01); *G06T 2207/20021* (2013.01); *G06T 2207/20076* (2013.01); *G06T 2207/20081* (2013.01); *G06T 2207/20084* (2013.01); *G06T 2207/30008* (2013.01); *G06V 2201/033* (2022.01)

(58) Field of Classification Search
CPC . G06T 2207/20081; G06T 2207/20084; G06T 2207/30008; G06V 10/764; G06V 10/82; G06V 2201/033
See application file for complete search history.

(56) References Cited

U.S. PATENT DOCUMENTS

| | | |
|---|---|---|
| 11,315,242 B2 | 4/2022 | Katouzian et al. |
| 2003/0215120 A1* | 11/2003 | Uppaluri ............... A61B 6/505 382/128 |
| 2014/0247977 A1* | 9/2014 | Han ......................... G06T 7/11 382/159 |
| 2019/0005684 A1* | 1/2019 | De Fauw ............... G06V 10/82 |
| 2019/0336097 A1* | 11/2019 | Bregman-Amitai ........................ G06V 10/764 |
| 2020/0082530 A1* | 3/2020 | Chabin ............... G06F 18/2431 |
| 2020/0401843 A1* | 12/2020 | Peng .................... G06F 18/217 |
| 2022/0148164 A1* | 5/2022 | Hassanpour ......... A61B 6/5217 |
| 2023/0089026 A1* | 3/2023 | Tran ........................ A61B 6/48 705/2 |
| 2024/0249844 A1* | 7/2024 | Siebachmeyer ...... G06T 7/0014 |
| 2024/0296554 A1* | 9/2024 | Palaniappan .......... G06N 3/094 |

\* cited by examiner

SYSTEM AND METHOD FOR CLASSIFYING TYPE OF A FRACTURE ON MUSCULOSKELETAL X-RAY IMAGE

CROSS REFERENCE TO RELATED APPLICATIONS

The present application claims the benefit of Indian Patent Application number 202321075163 filed on Nov. 3, 2023, the contents of which are incorporated herein by reference in their entirety.

FIELD OF INVENTION

The present subject matter, in general, relates to a field of medical image processing. More specifically, the present invention relates to a classification of a type of fracture. More particularly, the present invention relates to the classification of a type of fracture on a musculoskeletal X ray image, using artificial intelligence-based techniques.

BACKGROUND OF THE INVENTION

This section is intended to introduce the reader to various aspects of art, which may be related to various aspects of the present disclosure that are described or claimed below. This discussion is believed to be helpful in providing the reader with background information to facilitate a better understanding of the various aspects of the present disclosure. Accordingly, it should be understood that these statements in this background section are to be read in this light, and not as admissions of prior art. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Fractures are common injuries in patients of all age groups, often resulting from accidents, sports activities, falls and underlying medical conditions like osteoporosis. Timely and accurate fracture classification in patients is crucial for appropriate treatment and management.

Traditionally, medical imaging techniques, such as computed topography (CT) and X-ray imaging, have been the cornerstone for identifying fractures. Conventional X-ray radiography is still a valuable tool in fracture detection. Further, computed tomography (CT) and magnetic resonance imaging (MRI) techniques have improved the accuracy of fracture detection. Such diagnostic techniques are known to necessarily require highly skilled medical professionals, radiologists. Further, conventional instruments used for the diagnostic techniques require appropriate set up, assembling, and operational skills to be worked upon. The medical imaging techniques assist in diagnosis as well as treatment of medical conditions. It is well known that obtaining an X-ray requires at least skilled medical professionals, a lab facility, or a diagnostic centre. Further, an interpretation of the X-ray report requires skilled professionals such as radiologists and doctors as well.

Typically, non-clinicians such as nurses, physiotherapists, health care providers and patients are not trained and equipped to perform the conventional diagnostic techniques. It may be understood that consulting a doctor, seeking an appointment for conventional X-ray, undergoing the X-ray procedure, procuring the X-ray reports, and then getting the X-ray reports interpreted by doctors, radiologists and the like may become a time-consuming process. Further, there is a possibility of partial diagnosis or an incomplete diagnosis if the X-ray image is not interpreted accurately. Therefore, these methods are complex and time-consuming making them less suitable for rapid diagnosis and point-of-care applications.

Artificial intelligence (AI) has revolutionized the healthcare industry by enabling the analysis of patient data, whether in the form of text or medical images. While AI has made significant strides in image recognition, the precise identification of type of fractures, especially in complex anatomical structures or when subtle fractures are involved, remains a challenge. Conventional systems may miss subtle fractures or misclassify the type of fracture, particularly in complex cases. The diversity in the presentation of fractures, including variations in size, location, and severity, poses a formidable hurdle. The existing AI models often struggle to generalize effectively across this spectrum, leading to false positives or negatives, and further leading to misdiagnosis or missed fractures. Hence, interpreting complex X-ray images accurately, especially in cases with subtle or unconventional fracture patterns, remains a challenge. The AI system must be able to classify type of fractures even when they do not conform to standard patterns.

Additionally, the robustness of these systems to handle variations in X-ray image quality, positioning, and patient demographics is a concern. Real-world X-ray images can exhibit substantial variability. Therefore, there is need for an improved system which performs consistently and accurately under such conditions.

Therefore, there is a long-standing need for an improved system and method for classifying a type of fracture on a musculoskeletal X-ray image, to overcome the above-mentioned problems.

SUMMARY OF THE INVENTION

The present disclosure overcomes one or more shortcomings of the prior art and provides additional advantages discussed throughout the present disclosure. Additional features and advantages are realized through the techniques of the present disclosure. Other embodiments and aspects of the disclosure are described in detail herein and are considered a part of the claimed disclosure.

It is also to be understood that the terminology used in the description is for the purpose of describing the versions or embodiments only and is not intended to limit the scope of the present application.

This summary is not intended to identify essential features of the claimed subject matter nor is it intended for use in detecting or limiting the scope of the claimed subject matter.

In one implementation of the present disclosure, a system for classifying a type of fracture on musculoskeletal X-ray image is disclosed. The system may comprise a memory and a processor. The processor may be configured to execute instructions stored in the memory. Further, the system may comprise a data collection module. The data collection module may be configured to collect data which may correspond to an input X-ray image. Furthermore, the system may comprise a fracture-type classification module. The fracture-type classification module may be configured for classifying the type of fracture based on the collected data using a classification model and a segmentation model based on an artificial intelligence. Furthermore, the classification model and the segmentation model may be carried out by the processor. The classification model may be configured to perform a step of analysing the input X-ray image to recognize a plurality of tags. The plurality of tags may include the types of the fracture. Further, the classification model may be configured for calculating a classification score corresponding to the recognition of the plurality of tags. Further, the segmentation model may be configured to perform a step of dividing the input X-ray image into a plurality of pixels to determine a probability of fracture for each pixel of the plurality of pixels. The segmentation model may be further configured for calculating a segmentation score for each pixel of the plurality of pixels, corresponding to the probability of fracture. The fracture-type classification module may be configured for generating the fracture-type score based on the classification score and the segmentation score. The fracture-type classification module may be configured for comparing the fracture-type score with a threshold value for each fracture part separately to classify the type of the fracture.

In one embodiment, the system may comprise a report generation module to generate a fracture-type classification report. The fracture-type classification report may comprise information of the type of fracture.

In one embodiment, the type of fracture may be at least one of a plurality of the type of fractures including a healed fracture, a chronic fracture, a hairline fracture, a greenstick fracture, an acute fracture, a displaced fracture, and an un-displaced fracture.

In one embodiment, the fracture-type classification module may be configured to train both the classification model and the segmentation model using data collected through the data collection module. The fracture-type classification module may correspond to a deep learning algorithm. The deep learning algorithm may be a convolutional neural network (CNN).

In yet another embodiment, the classification model and the segmentation model may correspond to one of an EfficientNet, a U-Net, and a combination thereof, based neural network.

In another implementation, a method for classifying a type of fracture on musculoskeletal X-ray image. The method may comprise a step for collecting data corresponding to an input X-ray image using a data collection module. The method may comprise a step for classifying the type of fracture based on the collected data using a classification model and segmentation model based on an artificial intelligence. The method may comprise a step for analysing the input X-ray image to recognize a plurality of tags using the classification model. The plurality of tags may include the type of the fractures. The method may further comprise a step for calculating a classification score, corresponding to the recognition of the plurality of tags using the classification model. The method may comprise a step for dividing the input X-ray image into a plurality of pixels to determine a probability of fracture for each pixel of the plurality of pixels, using the segmentation model. The method may comprise a step for calculating a segmentation score for each pixel of the plurality of pixels, corresponding to a level of probability of fracture, using the segmentation model. Further, the method may comprise a step for generating the fracture-type score based on the classification score and the segmentation score, using the fracture-type classification module. The method may further comprise a step for comparing the fracture-type score with a threshold value for each fracture part separately to classify the type of fracture, using the fracture-type classification module.

In one embodiment, the method may comprise a step for generating a fracture-type classification report using a report generation module. The fracture-type classification report may comprise information on the type of fracture to each of the fractured parts.

In yet another embodiment, the method may comprise a step for training the classification model and the segmentation model using data collected by the data collection model.

In yet another embodiment, the fracture type classification module may correspond a deep learning algorithm. In yet another embodiment, the deep learning algorithm may be a convolution neural network (CNN).

In yet another embodiment, the classification model and the segmentation model may correspond to one of an EfficientNet, a U-Net, and a combination thereof, based neural network.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION OF THE INVENTION

Figure 1:
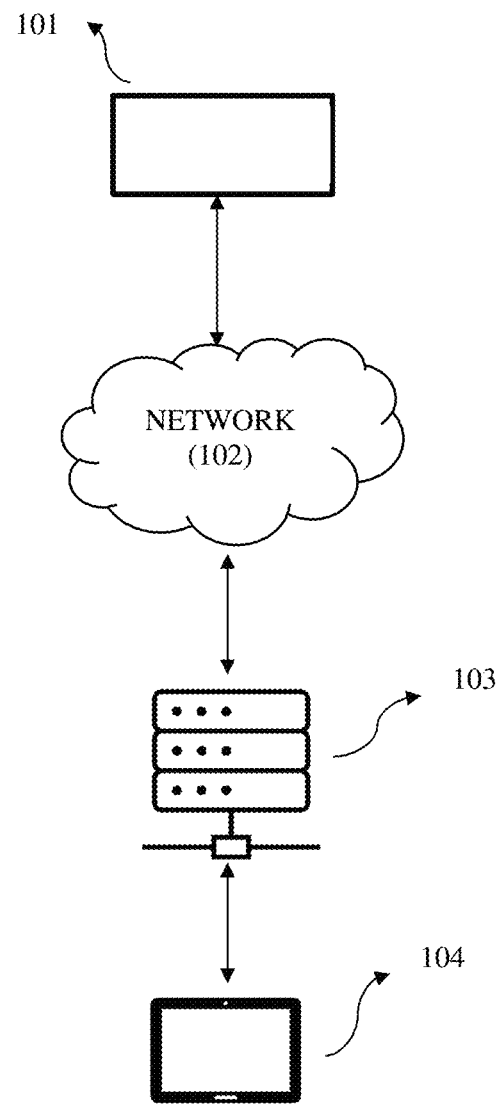
FIG. 1 illustrates a network implementation of a system (100) for classifying types of fracture on musculoskeletal X-ray image (101), in accordance with an embodiment of a present subject matter.

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the features, structures or characteristics may be combined in any suitable manner in one or more embodiments.

The words "comprising," "having," "containing," and "including," and other forms thereof, are intended to be equivalent in meaning and be open ended in that an item or items following any one of these words is not meant to be an exhaustive listing of such item or items or meant to be limited to only the listed item or items. It must also be noted that, the singular forms "a," "an," and "the" include plural references unless the context clearly dictates otherwise. Although any methods similar or equivalent to those described herein can be used in the practice or testing of embodiments of the present disclosure, the exemplary methods are described. The disclosed embodiments are merely exemplary of the disclosure, which may be embodied in various forms.

The integration of artificial intelligence (AI) techniques in medical healthcare has revolutionized the industry by leveraging advanced algorithms and machine learning to analyse vast datasets, enhance diagnostic accuracy, personalize treatment plans, and streamline administrative processes. Conventional systems used in medical healthcare for detecting types of fractures in X-ray images face significant limitations. These systems typically rely on rule-based algorithms and manual interpretation, which can lead to inaccuracies and inconsistency in fracture diagnosis. Further, these systems struggle to adapt to variations in image quality, patient anatomy, and fracture subtleties, often missing subtle or complex fractures. Additionally, conventional systems lack the ability to learn and evolve over time, making them less effective in keeping up with advancements in medical knowledge and imaging technology. As a result, there is a pressing need to transition towards more advanced artificial intelligence-based solutions, such as deep learning models, to overcome these challenges and enhance the accuracy and efficiency of fracture detection in medical radiology.

In the light of the above-mentioned limitations, the present subject matter harnesses the artificial intelligence-based, specifically a classification model and a segmentation model, to provide more accurate and consistent results. The disclosed system may improve the accuracy of classification of a type of fractures, including subtle ones. The system may be capable to adapt and self-improve over time which ensures superior performance and a personalized fracture classification report, revolutionizing fracture diagnosis in healthcare.

The present disclosure illustrates use of "Artificial intelligence (AI)" in medical image processing. AI is a theory, method, technology and application system that uses a digital computer, or a machine controlled by a digital computer to simulate, extend and expand human intelligence, perceive the environment, acquire knowledge, and use knowledge to obtain the best results. In other words, artificial intelligence is a comprehensive technology of computer science, which attempts to understand the essence of intelligence and produce a new kind of intelligent machine that can react in a similar way to human intelligence. Artificial intelligence is to study the design principles and implementation methods of various intelligent machines, so that the machines have the functions of perception, reasoning and decision-making. AI technology is a comprehensive discipline, covering a wide range of fields, including both hardware-level technology and software-level technology. Basic artificial intelligence technologies generally include technologies such as sensors, dedicated artificial intelligence chips, cloud computing, distributed storage, big data processing technologies, operation/interaction systems, and mechatronics. Artificial intelligence software technology mainly includes computer vision technology, speech processing technology, natural language processing technology, and machine learning/deep learning.

The present disclosure illustrates various techniques and configurations that enable the integration and use of machine learning analysis in a data-driven image evaluation workflow. For example, machine learning analysis (such as trained models of image detection of certain medical conditions) may be performed upon medical imaging procedure data produced as part of a medical imaging study. The medical imaging procedure data may include image data captured by an imaging modality, and order data (such as data indicating a request for a radiological image read), each produced to facilitate a medical imaging evaluation (such as a radiology read to be performed by a radiologist or a diagnostic evaluation by another qualified medical professional). For example, machine learning analysis may receive and process images from medical imaging procedure data, to identify trained structures, conditions, and conditions within images of a particular study. The machine learning analysis may result in the automated detection, indication, or confirmation of certain medical conditions within the images, such as the detection of urgent or life-critical medical conditions, clinically serious abnormalities, and other key findings. Based on the result of the machine learning analysis, the medical evaluation for the images and the associated imaging procedure may be prioritized, or otherwise changed or modified. Further, the detection of the medical conditions may be used to assist the assignment of the medical imaging data to particular evaluators, the evaluation process for the medical imaging data, or implement other actions prior to, or concurrent with, the medical imaging evaluation (or the generation of a data item such as a report from such medical imaging evaluation).

As further discussed herein, the machine learning analysis may be provided on behalf of any number of machine learning algorithms and trained models, including but not limited to deep learning models (also known as deep machine learning, or hierarchical models) that have been trained to perform image recognition tasks, particularly for certain types of medical conditions upon medical images of human anatomy and anatomical representations. As used herein, the term "machine learning" is used to refer to the various classes of artificial intelligence algorithms and algorithm-driven approaches that are capable of performing machine driven (e.g., computer-aided) identification of trained structures, with the term "deep learning" referring to a multiple-level operation of such machine learning algorithms using multiple levels of representation and abstraction. However, it will be apparent that the role of the machine learning algorithms that are applied, used, and configured in the presently described medical imaging evaluation may be supplemented or substituted by any number of other algorithm-based approaches, including variations of artificial neural networks, learning-capable algorithms, trainable object classifications, and other artificial intelligence processing techniques.

In one non-limiting embodiment, a system for the classification of a type of fracture on musculoskeletal X-ray image is disclosed. The system may include a variety of data collected in the form of X-ray image data. The classification model and the segmentation model based on an artificial intelligence may correspond to a deep learning-based imaging model, which helps in classifying the type of the fracture from musculoskeletal X-ray image in an intelligent manner. The system may be capable of learning from its operation, improving its fracture type classification capabilities over time The system can learn from each interaction, continuously refining its understanding of individual data and corresponding to classification of the type of the fracture on musculoskeletal X-ray image.

Figure 2:
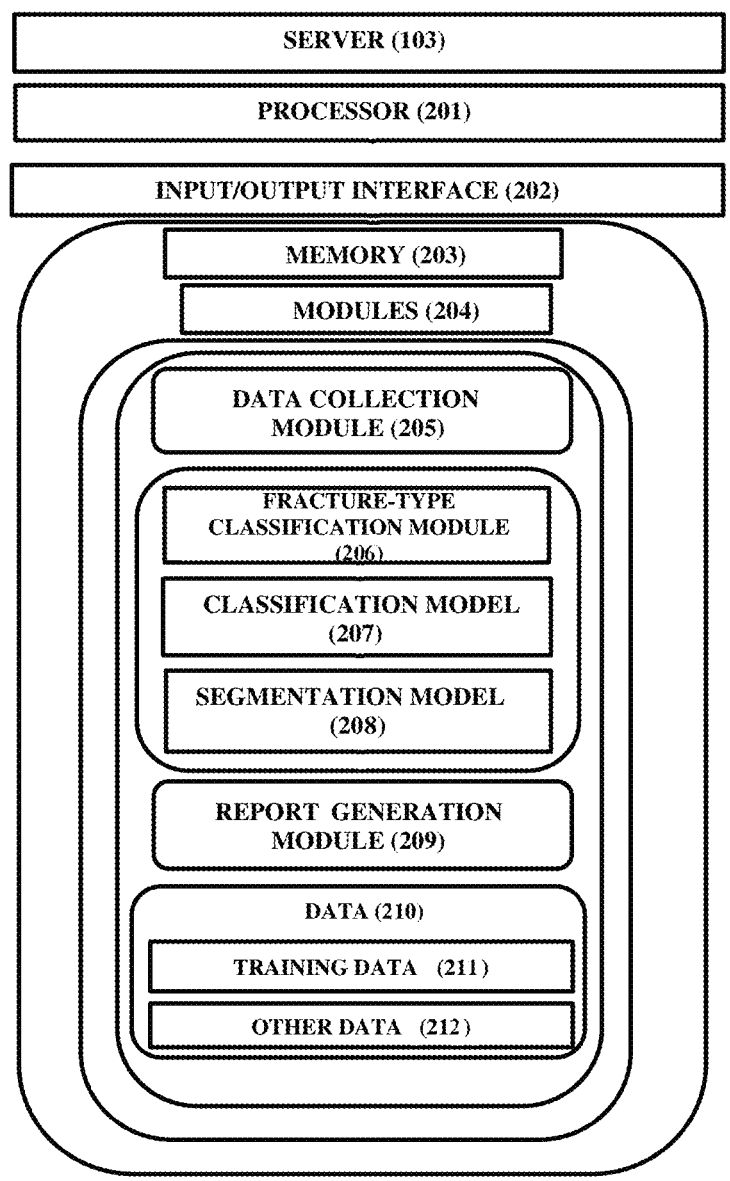
FIG. 2 illustrates a block diagram (200) showing an overview of a server (103) for classifying the types of fracture on musculoskeletal X-ray image (101), in accordance with an embodiment of a present subject matter.

Now referring to FIG. 1, a diagram describing a system (100) classifying a type of fracture on musculoskeletal X-ray image (101), is illustrated in accordance with an embodiment of a present subject matter. The system (100) may include data (210) collected in the form of an input X-ray image (101). The collected data (210) is coupled with the server (103) via a network (102) connection. Further, considering that the system (100) is implemented on a server (103), it may be understood that the system (100) may be accessed via a variety of computing system (104). The computing system (105) may correspond to an interface which enables the user to interact with the system (100). The computing system (105) may comprise one selected from a group consisting of a cell phone, personal digital assistant (PDA), laptop computer, stationary personal computer, IPTV remote control, web tablet, laptop computer, pocket PC, a television set capable of receiving IP based video services and mobile IP device. In an embodiment, the system (100) may be configured to receive user data from one or more users, via the computing system (105). The collected data may be in the form of the input X-ray image (101). In an embodiment, the input X-ray image (101) may be collected by the server (103) via the network (102) and transmitted to a memory (203) (as illustrated in FIG. 2) for storage. Further, the functionality and other characteristics of the server (103) would be provided in description of FIG. 2.

In yet another embodiment, the collected data (210), the server (103) and the computing system (104) may communicate with each other via the network (102). In one implementation, the network (102) may be a wireless network, a wired network, or a combination thereof. The network (102) can be implemented as one of the different types of networks, such as intranet, local area network (LAN), wide area network (WAN), the internet, and the like. The network (102) may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network (102) may include a variety of network devices, including routers, bridges, servers, computing devices, storage devices, and the like.

In another embodiment, the network (102) may include any one of the following: a cable network, the wireless network, a telephone network (e.g., Analog, Digital, POTS, PSTN, ISDN, xDSL), a cellular communication network, a mobile telephone network (e.g., CDMA, GSM, NDAC, TDMA, E-TDMA, NAMPS, WCDMA, CDMA-2000, UMTS, 3G, 4G, 5G, 6G), a radio network, a television network, the Internet, the intranet, the local area network (LAN), the wide area network (WAN), an electronic positioning network, an X.25 network, an optical network (e.g., PON), a satellite network (e.g., VSAT), a packet-switched network, a circuit-switched network, a public network, a private network, and/or other wired or wireless communications network configured to carry data.

The system (100) can be implemented using hardware, software, or a combination of both, which includes using where suitable, one or more computer programs, mobile applications, or "apps" by deploying either on-premises over the corresponding computing terminals or virtually over cloud infrastructure. The system (100) may include various micro-services or groups of independent computer programs which can act independently in collaboration with other micro-services. The system (100) may also interact with a third-party or external computer system. Internally, the system (100) may be the central processor of all requests for transactions by the various actors or users of the system. a critical attribute of the system (100) is that it can concurrently and instantly complete an online transaction by a system user in collaboration with other systems.

Now, referring to FIG. 2, a block diagram (200) showing an overview of the server (103) for classifying the type of the fracture on musculoskeletal X-ray image (101), is illustrated in accordance with an embodiment of the present subject matter. The server (103) includes a processor (201), an input/output (I/O) interface (202), and the memory (203). The processor (201) is coupled with the memory (203). The processor (201) is configured to execute programmed instructions stored in the memory (203). Further, the memory (203) may include variety of modules (204) namely a data collection module (205), a fracture-type classification module (206), and a report generation module (209). Additionally, the fracture-type classification module (206) may include the classification model (207) and the segmentation model (208). In one embodiment, the server (103) utilizes the processor (201) for executing the various modules (204) stored in the memory (203). Furthermore, the data (210) collected from the input X-ray image (101). Furthermore, the memory (203) may include a training data (211) and other data (212) module as a part of the collected data (210). The training data (211) may be used to compare the fracture-type score with the threshold values stored in the data (210) module. The system (100) may learn from each interaction, continuously refining its understanding of the data (210) collected from the input X-ray image (101) and analysing the X-ray image (101) to recognize a plurality of tags. The plurality of tags including the fracture-type.

Further, the processor (201), in one embodiment, may comprise a standard microprocessor, microcontroller, central processing unit (CPU), distributed or cloud processing unit, state machines, logic circuitries, and/or any devices that manipulate signals based on operational instructions and/or other processing logic that accommodates the requirements of the present invention. Further, the I/O interface (202) is an interface to other components of the server (103) and the system (100). The I/O interface (202) may include a variety of software and hardware interfaces, for example, a web interface, a graphical user interface, and the like. The I/O interface (202) may allow the system (100) to interact with the user directly or through the computing devices (105). Further, the I/O interface (202) may enable the system (100) to communicate with other computing devices, such as web servers and external data servers (not shown). The I/O interface (202) can facilitate multiple communications within a wide variety of networks and protocol types, including wired networks, for example, LAN, cable, etc., and wireless networks, such as WLAN, cellular, or satellite. The I/O interface (202) may include one or more ports for connecting a number of devices to one another or to another server. In one embodiment, the I/O interface (202) allow the server (103) to be logically coupled to other computing system (104), some of which may be built in. Illustrative components include tablets, mobile phones, scanner, printer, wireless device, etc. Further, the processors (201) can read data from various entities such as memory (203) or I/O interface (202). The processor's (201) primary functions encompass data acquisition, wherein it gathers data (210) from the X-ray image (101). Following this, the collected data undergoes analysis through specialized modules, and the system (100) computes an overall fracture-type classification score. Ultimately, it generates a fracture-type classification report (403), by the analysis of input X-ray image.

The memory (203) may include any computer-readable medium or computer program product known in the art including, for example, volatile memory, such as static random-access memory (SRAM) and dynamic random-access memory (DRAM), and/or non-volatile memory, such as read only memory (ROM), erasable programmable ROM, flash memories, hard disks, Solid State Disks (SSD), optical disks, magnetic tapes, memory cards, virtual memory and distributed cloud storage. The memory (203) may be removable, non-removable, or a combination thereof. The memory (203) may include routines, programs, objects, components, data structures, etc., which perform particular tasks or implement particular abstract data types. The memory (203) may include programs or coded instructions that supplement applications and functions of the system (100). In one embodiment, the memory (203), amongst other things, serves as a repository for storing data processed, received, and generated by one or more of the programs or the coded instructions. In yet another embodiment, the memory (203) may be managed under a federated structure that enables adaptability and responsiveness of the server (104). The memory (203) further may include various modules (204) namely the data collection module (205), the fracture-type classification module (206) including the classification model (207) and segmentation model (208), report generation module (209), and the data (210) module. In one embodiment, the server (103) utilizes the processor (201) for executing the various modules (204) stored in the memory (203).

In one embodiment, the data collection module (205) is configured to collect data corresponding to the input X-ray image (101). In an exemplary embodiment, the input X-ray image may correspond to a part of the body. The data collected by the data collection module (205) is utilized by the fracture-type classification module (206) for classifying the type of fracture in a body part. In one exemplary embodiment, the fracture-type classification module (206) is implemented by using an artificial intelligence-based system. In one implementation, the fracture-type classification module (206) may be configured to analyze the input X-ray image (101) by using the artificial intelligence-based system. Further, the fracture-type classification module (206) may generate an output regarding classification of the type of the fractures in the input X-ray image. In an embodiment, the fracture-type classification module (206) may utilize the processor (201) to implement the artificial intelligence-based system. The artificial intelligence-based system corresponds to a combination of the classification model (207) and the segmentation model (208). In a related implementation, the fracture-type classification module (206) may be configured to train the artificial intelligence-based system, including the classification model (207) and the segmentation model (208), using the input X-ray image (101).

The fracture-type classification module (206) may include, classification model (207), with the help of processor (201), is configured to analyse the input X-ray image (101) based on the collected data (210). In one embodiment, the collected data (210) may be the training data (211). In one embodiment, the classification model (207) may be trained using the training data (211). In one exemplary embodiment, the training data may comprise, but not limited to, a plurality of tags of the items present in each pixel of the input X-ray image, a threshold value for each type of fracture of a plurality of type of fractures. In one embodiment, the plurality of type of fractures may include a healed fracture, a chronic fracture, a hairline fracture, a greenstick fracture, an acute fracture, a displaced fracture, and an un-displaced fracture. The classification model (207) may be trained to recognize the plurality of tags. Further, the classification model (207) may be trained to calculate a classification score, corresponding to the recognition of the plurality of tags. This capability of tag recognition and scoring adds a layer of precision and depth to the system's fracture type classification capabilities, enhancing diagnostic accuracy in the medical context.

In one embodiment, the classification model (207) may be trained using deep learning (may also be called as deep learning techniques) which is a part of a machine learning family. The deep learning techniques may comprise multiple layers in a network. The deep learning techniques may comprise a Convolutional Neural Network (CNN) technique. The deep learning techniques may use a trained data model for an operation. The trained data model comprises historical information, musculoskeletal X-rays of a set of patients, medical history of the set of patients, the information associated to the nodules for the set of patients. It may be noted that the trained data model may be trained using a continuous learning approach like Reinforcement Learning techniques. The training data (211) model may correspond to data learned by the system to operate efficiently. The training data (211) model may enable an accurate operation of the deep learning techniques. In an example, imagine a medical AI system that scans an X-ray image of a broken bone. It first collects the X-ray data, then uses AI to classify the fracture type by recognizing specific features and calculating scores.

In one exemplary embodiment, the classification model (207) and the segmentation model (208) may be configured for training and collecting the trained data of 450,000 X-rays including different body parts. The dataset was meticulously labelled by expert radiologists, ensuring precise and dependable ground truth annotations for training.

In another exemplary embodiment, the classification model (207) and the segmentation model (208) are trained to provide output classification labels and binary segmentation masks for fractures, respectively.

In one exemplary embodiment, the classification model (207) and the segmentation model (208) may correspond to Unet++ based algorithm for the segmentation task keeping EfficientNetv2 as the backbone. EfficientNetv2 is a family of the convolutional neural network architectures designed for efficient and scalable image classification. It introduces compound scaling to balance model depth, width, and resolution, achieving high accuracy with fewer parameters. UNet++ is the convolutional neural network architecture commonly used for semantic segmentation tasks. It combines an encoder-decoder structure with skip connections to capture global and local features. UNet++ has been widely adopted and achieved state-of-the-art results in various medical imaging and computer vision applications.

Ground truth masks are annotated by a team of expert radiologists over a span of one year to draw free-hand boundaries across fractures on the X-rays and mark the labels as positive. The present system and method collected 550 X-ray scans and used 400 thousand for training and the remaining for validation. The input X-ray may contain multiple fractures consisting of frontal, lateral, and oblique views.

The classification model (207) may use Cross entropy loss for the classification. It measures the dissimilarity between the predicted probability distribution and the true label distribution, encouraging the model to minimize the difference between them.

The segmentation model (207) may use Dice-BCE loss the segmentation task. The Dice BCE (Binary Cross-Entropy) loss combines the Dice coefficient loss and the Binary Cross-Entropy loss. The former computes dissimilarity between the predicted and ground truth segmentation masks, encouraging accurate localization and segmentation by maximizing their overlap.

The classification model (207) and the segmentation model (208) are trained on three GPUs (NVIDIA Geforce RTX 3090) for 130 epochs with a batch size of 10000, and Stochastic Gradient Descent (SGD) optimizer. The OneCycleLR, a learning rate scheduler is used to optimize the training process by dynamically adjusting the learning rate during different stages of training. It involves gradually increasing and then decreasing the learning rate within a single training cycle. This technique aims to improve convergence speed, prevent overfitting, and achieve better generalization performance.

In one embodiment, the classification model (207) may analyse the input X-ray image (101) to recognize the plurality of tags present in the input X-ray image. Further, the classification model (207) may be configured for calculating a classification score corresponding to the recognition of the plurality of tags. In one embodiment, the classification model (207) may be configured to calculating classification score for each tag of the plurality of tags.

Figure 4:
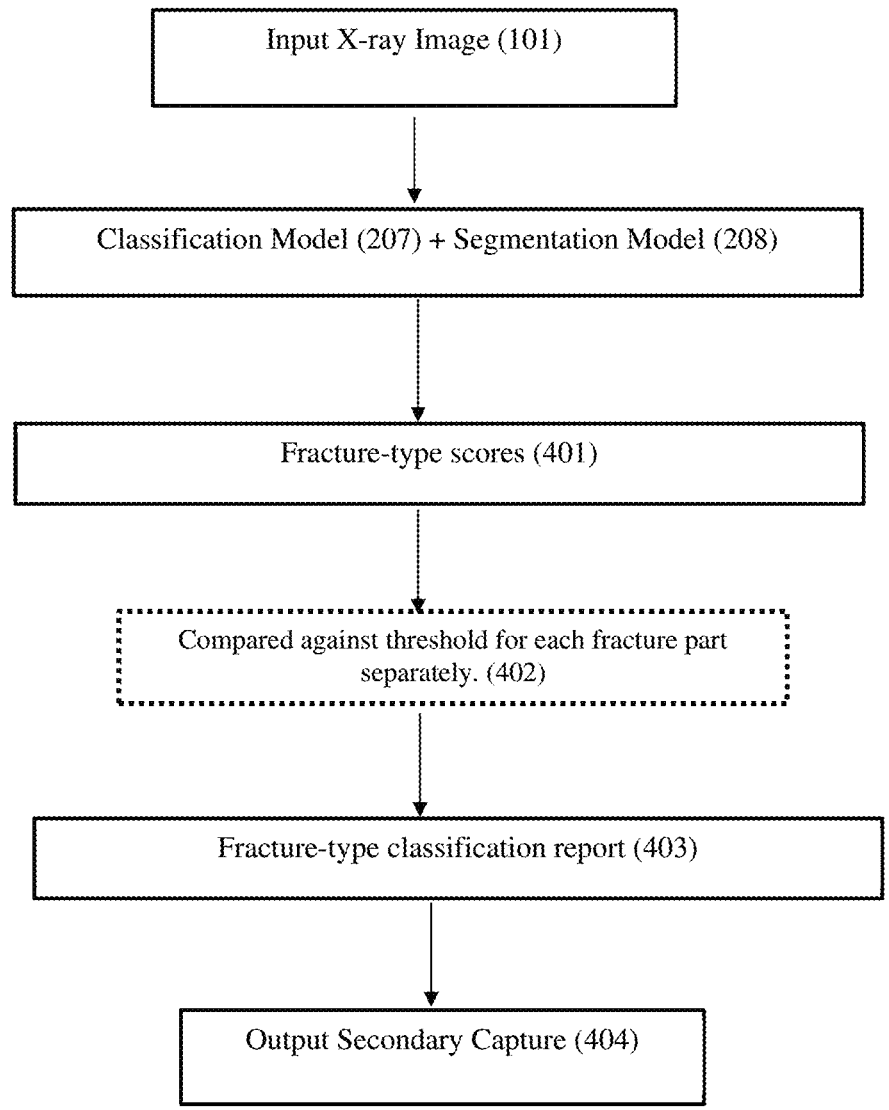
FIG. 4 illustrates a flowchart describing a workflow diagram (400) of the system (100) for classifying the types of fracture on musculoskeletal X-ray image (101), in accordance with an embodiment of the present subject matter.

Now referring to FIGS. 2 and 4, the fracture-type classification module (206) including the segmentation model (208) to perform a series of crucial steps driven by the artificial intelligence. Further, the segmentation model (208) in the system (100) may be configured for dividing the input X-ray image into a plurality of pixels to determine a probability of fracture for each pixel of the plurality of pixels. Furthermore, the segmentation model (208) may be configured for calculating a segmentation score for each pixel of the plurality of pixels, corresponding to a level of the probability of fracture. In one exemplary embodiment, the segmentation model (208) may process the input X-ray image with a resolution of 1080×920 pixels. The segmentation model (208) may calculate a numeric score for each pixel of the 1080×920 within the range of 0 to 1. Furthermore, the calculated score of each pixel may be compared with corresponding threshold value. Following this comparison, all pixels for which the calculated score exceeds the threshold value may be employed to generate a binary mask.

Further, the fracture-type classification module (206) may be configured for generating the fracture-type score (401) based on the classification score and the segmentation score. Furthermore, the fracture-type score (401) is determined using the plurality of tags including tag for the fracture-type. Furthermore, the fracture-type classification module (206) may be configured for comparing the fracture-type score (401) with a threshold value for each fracture part separately to classify the type of the fracture.

Figure 5:
FIG. 5 illustrates a fracture-type classification report (500) generated by a report generation module (209) of the system (100) for classifying the types of the fracture, in accordance with an embodiment of the present subject matter.

The present system may ensure accurate and detailed fracture classification within the image. Further, the type of the fracture classified using the fracture-type classification module (206) may be at least one of the plurality of type of fractures including the healed fracture, the chronic fracture, the hairline fracture, the greenstick fracture, the acute fracture, the displaced fracture, and the un-displaced fracture. Now referring to FIG. 5, the fracture-type classification report (500) generated by the report generation module (209) is illustrated, in accordance with an embodiment of the present subject matter. The fracture-type classification report (500) may provide information on the type of the fracture as the un-displaced fracture (501) and the acute fracture (502).

Although the present disclosure is explained considering that the system (100) is implemented on a server (103), it may be understood that the system (100) may be implemented in a variety of computing systems, such as a laptop computer, a desktop computer, a notebook, a workstation, a virtual environment, a mainframe computer, a server, a network server, a cloud-based computing environment. It will be understood that the system (100) may be accessed by multiple users through one or more user devices. In one implementation, the system (100) may comprise the cloud-based computing environment in which the user may operate individual computing systems configured to execute remotely located applications. Examples of the user devices may include, but are not limited to, a portable computer, a personal digital assistant, a handheld device, and a workstation.

Figure 3:
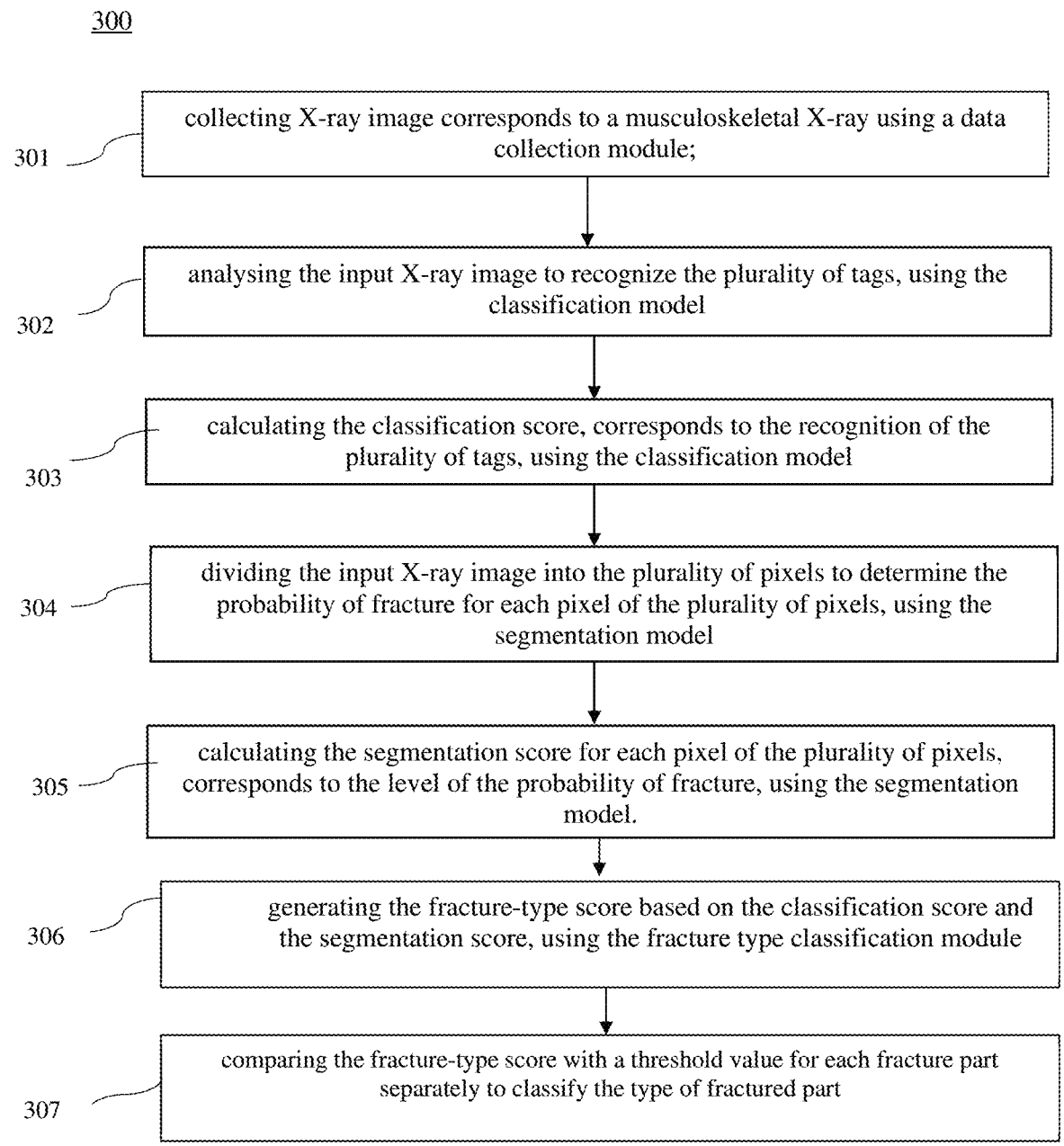
FIG. 3 illustrates a flowchart describing a method (300) for classifying the types of fracture on musculoskeletal X-ray image (101), in accordance with an embodiment of the present subject matter.

Now referring to FIG. 3, a flowchart describing a method (300) for classifying the type of fractures on a musculoskeletal X-ray image (101), is illustrated in accordance with an embodiment of the present subject matter. The method (300) is structured as a step-by-step process.

The method (300) for classifying the type of the fractures on musculoskeletal X-ray image (101) fracture involves several steps.

At step (301), the method (300) may comprise collecting data corresponding the input X-ray image (101) using a data collection module (205).

At step (302), the method (300) may comprise analysing the input X-ray image to recognize a plurality of tags, using a classification model (207). In one embodiment, the plurality of tags may include the fracture-types.

At step (303), the method (300) may comprise calculating the classification score, corresponding to the recognition of the plurality of tags.

At step (304), the method (300) may comprise dividing the input X-ray image (101) into the plurality of pixels, using a segmentation model (208), to determine a probability of fracture for each pixel of the plurality of pixels. At step (305), the method (300) may comprise calculating the segmentation score for each pixel of the plurality of pixels, corresponds to the probability of fracture. At step (306), the method (300) may comprise generating the fracture-type score (401) based on the classification score and the segmentation score, using a fracture-type classification module (206). In one embodiment, the fracture-type score (401) is determined using the plurality of tags including the fracture-type. At step (307), the method (300) may comprise comparing the fracture-type score (401) with a threshold value for each fracture part separately to classify the type of fractured part.

These steps collectively constitute an advanced and efficient process for accurate fracture type classification.

In one embodiment, the method (300) disclosed in the present subject matter encompasses a comprehensive approach for classifying and reporting type of fractures in musculoskeletal X-ray images.

The method may further include a step for generating the fracture-type classification report using the report generation module (209).

Now referring to FIG. 4, illustrates a flowchart describing a workflow diagram (400) of the system (100) for classifying the type of the fractures on musculoskeletal X-ray image (101), in accordance with an embodiment of the present subject matter. The workflow diagram (400) provides the steps performed by the system (100) for classifying the type of the fracture for each fracture parts. The workflow may begin with inputting an X-ray image (101), which is processed through the classification model (207) and the segmentation model (208) to derive fracture-type scores (401). Further, these fracture-type scores (401) are then individually compared against predefined thresholds for each fracture part (402), leading to the generation of a fracture-type classification report (403). Finally, the output is a secondary capture (404) containing comprehensive information about the classified fracture types and their locations. This information can be used by radiologists and clinicians to diagnose and treat fractures more accurately and efficiently. For example, the information from the classification and segmentation models could be used to develop a decision support system that can help radiologists to determine the best course of treatment for a particular patient.

In another embodiment, the intelligence-based classification model (207) plays a pivotal role. The classification model (207) may correspond to a deep learning algorithm, specifically a Convolutional Neural Network (CNN), which empowers it to recognize and assign scores to various tags present in X-ray images. These tags encompass crucial information such as the presence of fractures, the specific fracture types, and the associated body parts. Notably, the classification model (207) may be built upon the state-of-the-art EfficientNet_v2 architecture, ensuring its efficiency and robust performance in handling complex medical imaging data. Complementing this, the system (100) may employ the segmentation model (208), known as "UNet++," which excels in precisely delineating anatomical structures and fractured regions within the images. Together, these cutting-edge models form a formidable framework for accurate and detailed fracture-type classification, significantly enhancing the capabilities of medical professionals in diagnosing and treating patients with musculoskeletal injuries.

In one embodiment, the performance of the system and method is evaluated using performance metrics such as an Area Under Curve (AUC), an Average Precision (AP), a sensitivity, and a specificity.

In one exemplary embodiment, the training dataset for the system (100) and method (300) comprises 10,643 studies comprising 20,327 images, with posteroanterior and lateral projections. In the complete set of 20,327 scans, the present system and method has achieved an area under the curve (AUC) of 0.8593 (CI 0.8544-0.8642), an average precision (AP) of 0.9315, and a sensitivity and specificity of 0.7918. For female pediatric scans, the present system has achieved an AUC of 0.8522 (CI 0.8442-0.8602), an AP of 0.9053, and a sensitivity and specificity of 0.781. Similarly, for male pediatric scans, the present system has achieved an AUC of 0.8596 (CI 0.8532-0.8661), an AP of 0.9451, and a sensitivity and specificity of 0.7934. The achieved AUC, AP, sensitivity, and specificity values indicate the robust performance of the system, particularly in distinguishing fractures in different genders. The deep neural network was trained and tested on these x-ray scans for the classification and segmentation of fractures in eight body parts: leg, femur, wrist, fibula-tibia, shoulder, humerus, hand, and forearm. In this study, a random sample of 9600 x-ray scans from the test dataset was selected, comprising 1200 images for each body part. Further, the standard performance evaluation metrics are utilized to report the performance of the deep learning system.

In yet another embodiment, the system and method based on a deep learning algorithm has achieved an overall AUC of 0.9517 (C.I. 0.9469-0.9564), a sensitivity and specificity of 0.8842 and 0.9232 respectively, for fracture classification on all the body parts. The top two highest performance was achieved for femur and wrist fractures. The femur fractures were classified with an AUC of 0.9653, a sensitivity of 0.91, and a specificity of 0.90 while the wrist fractures with an AUC of 0.9558, a sensitivity of 0.89, and a specificity of 0.92. The present system and method has obtained greater than 0.94 AUC for all body parts classification with leg classified at AUC, sensitivity, and specificity of 0.9706, 0.91, and 0.91, respectively.

In an exemplary aspect, consider a patient present at a hospital with severe wrist pain following a fall. The doctor orders an X-ray to determine if there is an acute fracture in the patient's wrist. The disclosed system performs the following steps to classify the type of the fracture, firstly the X-ray image of the patient's wrist is taken, and this image becomes the input data for the intelligence-based fracture classification system. Further, the system uses its fracture-type classification module to calculate a fracture-type score based on the features it identifies. In this case, it classifies characteristics that indicate an acute fracture in the wrist. If the fracture-type score exceeds the established threshold (may be in the range of 20-30%) for acute wrist fractures, the system confidently identifies the presence of an acute wrist fracture. Furthermore, the report generation module generates a fracture-type classification report that includes details about the location and type of the fracture. In this case, the report would indicate the presence of an acute wrist fracture, providing valuable information to the medical team for diagnosis and treatment planning. Overall, this system leverages to equip healthcare professionals with valuable insights for informed decision-making and patient care.

EXAMPLE

Normal scenario (Unaided): If a patient comes to the hospital with a suspected fracture, the healthcare professional would then perform a physical examination. If the healthcare professional suspects that there is a fracture, they would recommend an X-ray image of the injured area. Once the X-ray image is available, the healthcare professional would review it to identify the presence of a fracture and determine its type.

Using Disclosed System (Aided): The mentioned technology could be used to assist in the diagnosis process. The healthcare professional would input the musculoskeletal X-ray image into the device. The fracture-type classification module including classification model would analyse the musculoskeletal X-ray image to recognize the plurality of tags, including the fracture-type, and calculate the fracture-type scores corresponding to the recognition of the plurality of tags. Whereas the fracture-type classification module would compare the fracture-type scores with a threshold value for each fracture part separately to classify type of fractures.

The system (100) as disclosed in the disclosure may provide valuable support in clinical decision-making, offering several advantages for the classification of fracture types in each affected part, including the following:

Enhanced Accuracy: Utilizes artificial intelligence to improve fracture classification accuracy, reducing the likelihood of misdiagnosis.

Comprehensive Analysis: Recognizes multiple tags in X-ray images, providing a detailed understanding of the fracture's characteristics.

Subtle Fracture classification: Capable of identifying subtle or hairline fractures that might be missed by human observers.

Efficiency: Automates the classification process, saving time for medical professionals.

Personalized Reports: Generates fracture classification reports, aiding in treatment decisions.

Adaptability: Can be trained and improved with more data, adapting to evolving medical knowledge and image variations.

Advanced Technology: Utilizes deep learning models, including convolutional neural networks (CNNs) and U-Net based networks, for robust fracture type classification.

Customizable Thresholds: Allows customization of threshold values for each fracture part, accommodating varying fracture types and complexities.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated but is to be accorded the widest scope consistent with the principles and features described herein.

The foregoing description shall be interpreted as illustrative and not in any limiting sense. A person of ordinary skill in the art would understand that certain modifications could come within the scope of this disclosure.

The embodiments, examples and alternatives of the preceding paragraphs or the description and drawings, including any of their various aspects or respective individual features, may be taken independently or in any combination. Features described in connection with one embodiment are applicable to all embodiments unless such features are incompatible.

The invention claimed is:

1. A system (100) for classifying a type of fracture on musculoskeletal X-ray image (101), characterized in that, the system (100) comprises:
   a memory (203);
   a processor (201) coupled with the memory (203), wherein the processor (201) is configured to execute programmed instructions stored in the memory (203);
   a data collection module (205), wherein data (210) collected by the data collection module (205) corresponds to an input X-ray image (101);
   a fracture-type classification module (206) for classifying the type of fracture based on the collected data (210), using a classification model (207) and a segmentation model (208) based on an artificial intelligence, wherein the classification model (207) and the segmentation model (208) carried out by the processor (201);
   wherein the classification model (207) is configured to perform steps of:
      analysing the input X-ray image (101) to recognize a plurality of tags, wherein the plurality of tags including the type of fractures;
      calculating a classification score, corresponds to the recognition of the plurality of tags; and
   wherein the segmentation model (208) is configured to perform step of:
      dividing the input X-ray image (101) into a plurality of pixels to determine a probability of fracture for each pixel of the plurality of pixels;
      calculating a segmentation score for each pixel of the plurality of pixels, corresponds to a level of the probability of fracture;
   wherein the fracture-type classification module (206) is configured for:
      generating a fracture-type score (401) based on the classification score and the segmentation score; and
      comparing the fracture-type score (401) with a threshold value for each fracture part separately to classify the type of the fracture.

2. The system (100) as claimed in claim 1, comprises a report generation module (209) to generate a fracture-type classification report (403), wherein the fracture-type classification report (403) comprises information on type of fracture.

3. The system (100) as claimed in claim 1, wherein the type of fracture is at least one of a plurality of type of fractures including a healed fracture, a chronic fracture, a hairline fracture, a greenstick fracture, an acute fracture, a displaced fracture, and an un-displaced fracture.

4. The system (100) as claimed in claim 1, wherein the fracture-type classification module (206) is configured to train the classification model (207) and the segmentation model (208) using data (210) collected by the data collection module (205), wherein the fracture-type classification module (206) corresponds to a deep learning algorithm, wherein the deep learning algorithm is a convolutional neural network (CNN).

5. The system (100) as claimed in claim 1, wherein the classification model (207) and the segmentation model (208) correspond to one of an EfficientNet, a U-Net, and a combination thereof, based neural network.

6. A method (300) for classifying a type of fracture on musculoskeletal X-ray image (101), characterized in that, comprising the steps of:
   collecting (301) data corresponds to an input X-ray image using a data collection module (205);
   classifying the type of fracture based on the collected data (210) using a fracture-type classification module (206), wherein the fracture-type classification module (206) comprises a classification model (207) and a segmentation model (208) based on an artificial intelligence,
   wherein the classification model (207) performs the following steps:
      analysing (302) the input X-ray image (101) to recognize a plurality of tags, wherein the plurality of tags including the type of fractures;
      calculating (303) a classification score, corresponds to the recognition of the plurality of tags; and
   wherein the segmentation model (208) performs the following steps:
      dividing (304) the input X-ray image (101) into a plurality of pixels to determine a probability of fracture for each pixel of the plurality of pixels;
      calculating (305) a segmentation score for each pixel of the plurality of pixels, corresponds to a level of probability of fracture;
   wherein the fracture-type classification module (206) is configured to perform steps of:
      generating (306) a fracture-type score (401) based on the classification score and the segmentation score; and
      comparing (307) the fracture-type score (401) with a threshold value for each fracture part separately to classify the type of the fracture.

7. The method (300) as claimed in claim 6, comprises a step for generating a fracture-type classification report using a report generation module (209), wherein the fracture-type classification report (403) comprises an information on the type of fracture to each of the fractured parts.

8. The method (300) as claimed in claim 7, wherein the type of fracture is at least one of a healed fracture, a chronic fracture, a hairline fracture, greenstick fracture, an acute fracture, a displaced fracture, and an un-displaced fracture.

9. The method (300) as claimed in claim 6, comprises a step for training the classification model (207) and the segmentation model (208) using data collected by the data collection module (205), wherein the fracture-type classification module (206) corresponds to a deep learning algorithm, wherein the deep learning algorithm is a convolutional neural network (CNN).

10. The method (300) as claimed in claim 6, wherein the classification model (207) and the segmentation model (208) correspond to one of an EfficientNet, a U-Net, and a combination thereof, based neural network.

* * * * *